Jan. 27, 1931.　　　F. E. WELCH　　　1,790,561
ROTARY ENGINE
Filed Sept. 28, 1927　　　5 Sheets-Sheet 1

INVENTOR
FRANK E. WELCH
BY
ATTORNEY

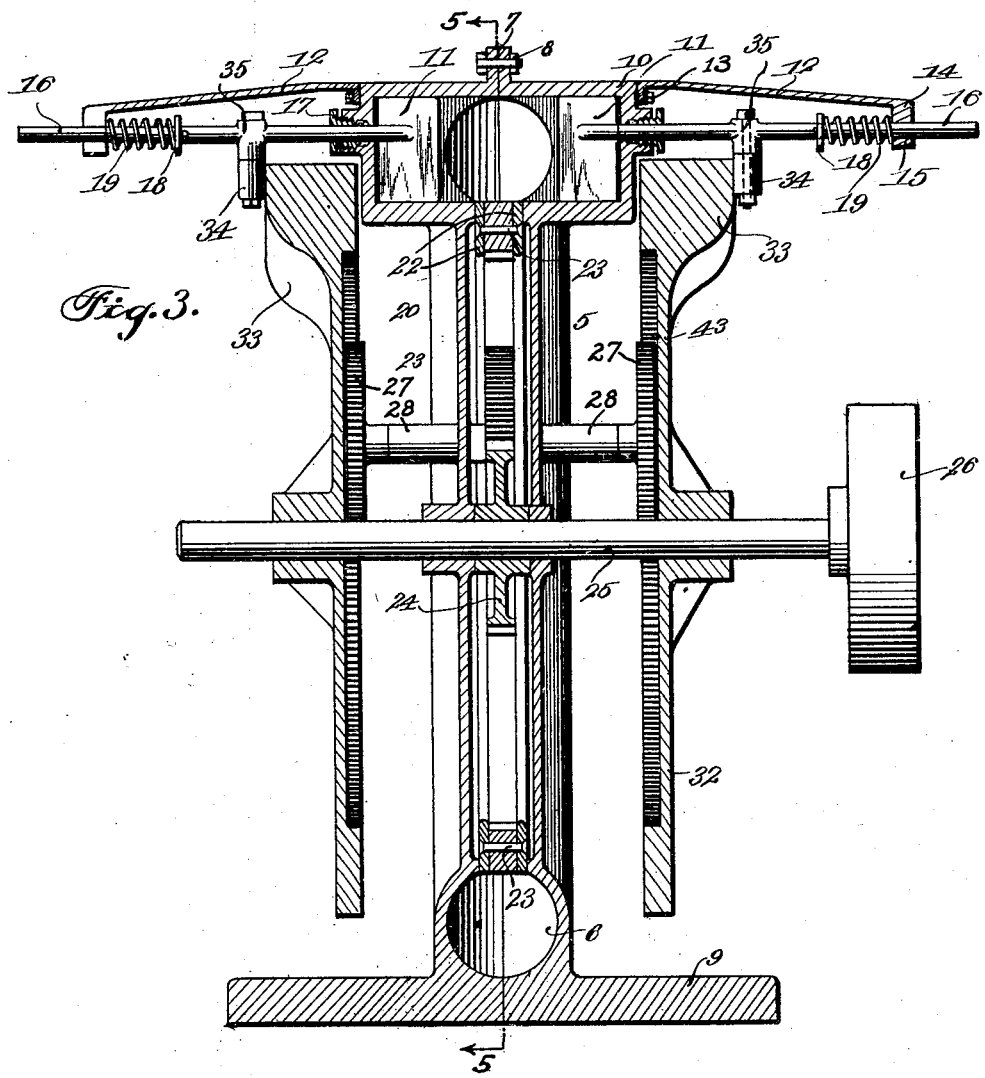
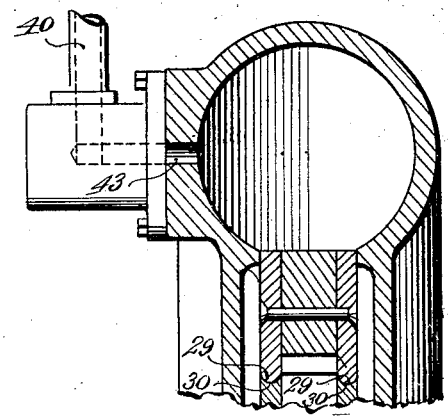

Jan. 27, 1931.  F. E. WELCH  1,790,561
ROTARY ENGINE
Filed Sept. 28, 1927   5 Sheets-Sheet 3

INVENTOR
FRANK E. WELCH
BY
ATTORNEY

Jan. 27, 1931.  F. E. WELCH  1,790,561
ROTARY ENGINE
Filed Sept. 28, 1927     5 Sheets-Sheet 5

INVENTOR
FRANK E WELCH
BY
ATTORNEY

Patented Jan. 27, 1931

1,790,561

UNITED STATES PATENT OFFICE

FRANK E. WELCH, OF ANN ARBOR, MICHIGAN

ROTARY ENGINE

Application filed September 28, 1927. Serial No. 222,577.

My invention relates to rotary engines and an object thereof is to provide a steam engine of this type which will operate to develop a maximum horse power, but will require only a minimum of steam pressure.

Further the invention provides a rotary steam engine embodying oppositely movable abutments having an improved actuating mechanism operable incident to the rotation of the engine power shaft.

With the preceding and other objects and advantages in mind, the invention consists in the novel combination of elements, constructions and arrangement of parts to be hereinafter specifically referred to, claimed and illustrated in the accompanying drawings, wherein:

Figure 3 is a vertical sectional view of the invention;

Figures 1, 2:
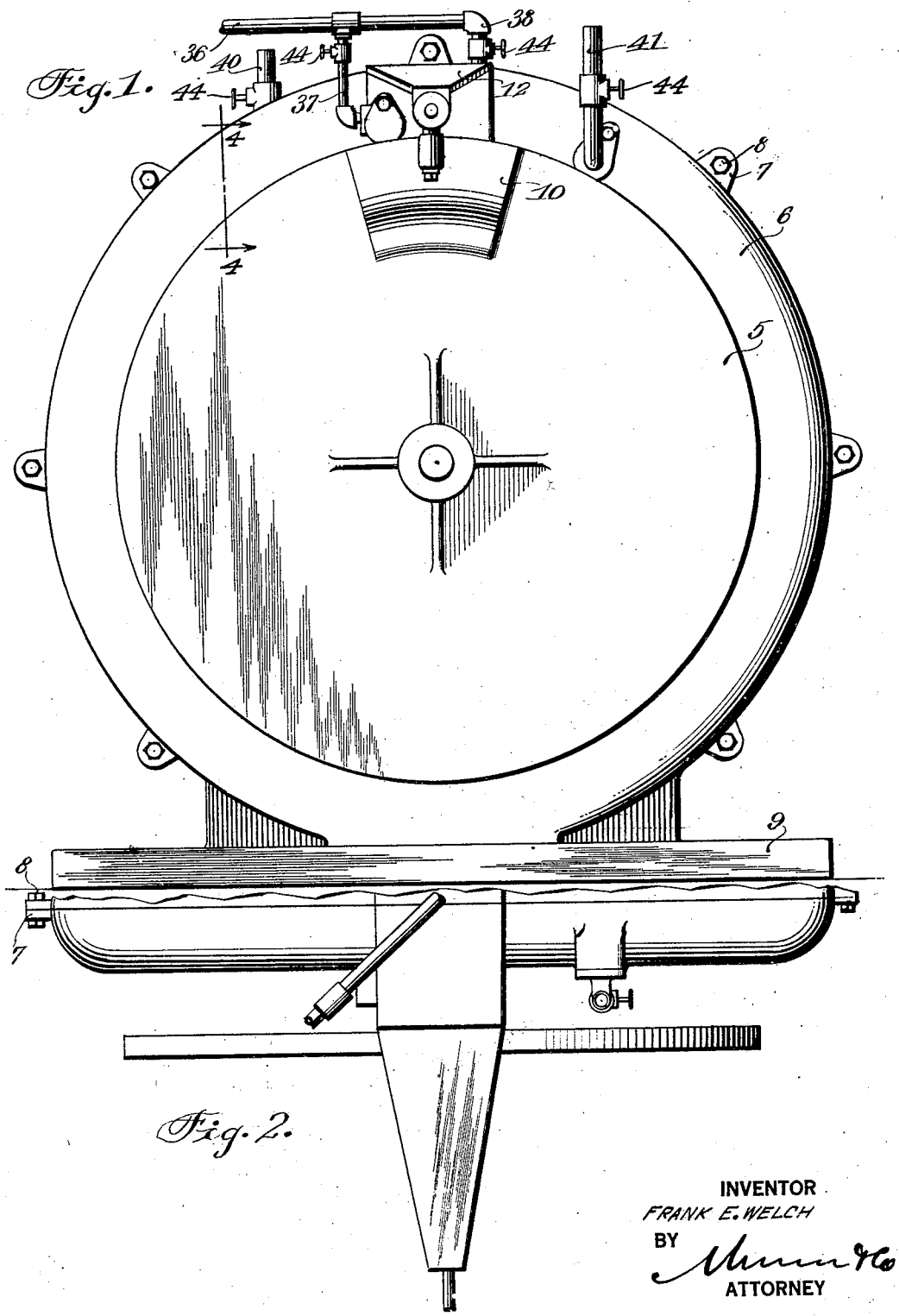
Figure 1 is a side elevation of a rotary engine constructed in accordance with my in20 vention.
Figure 2 is a fragmentary top plan view of the same.
Figure 5:
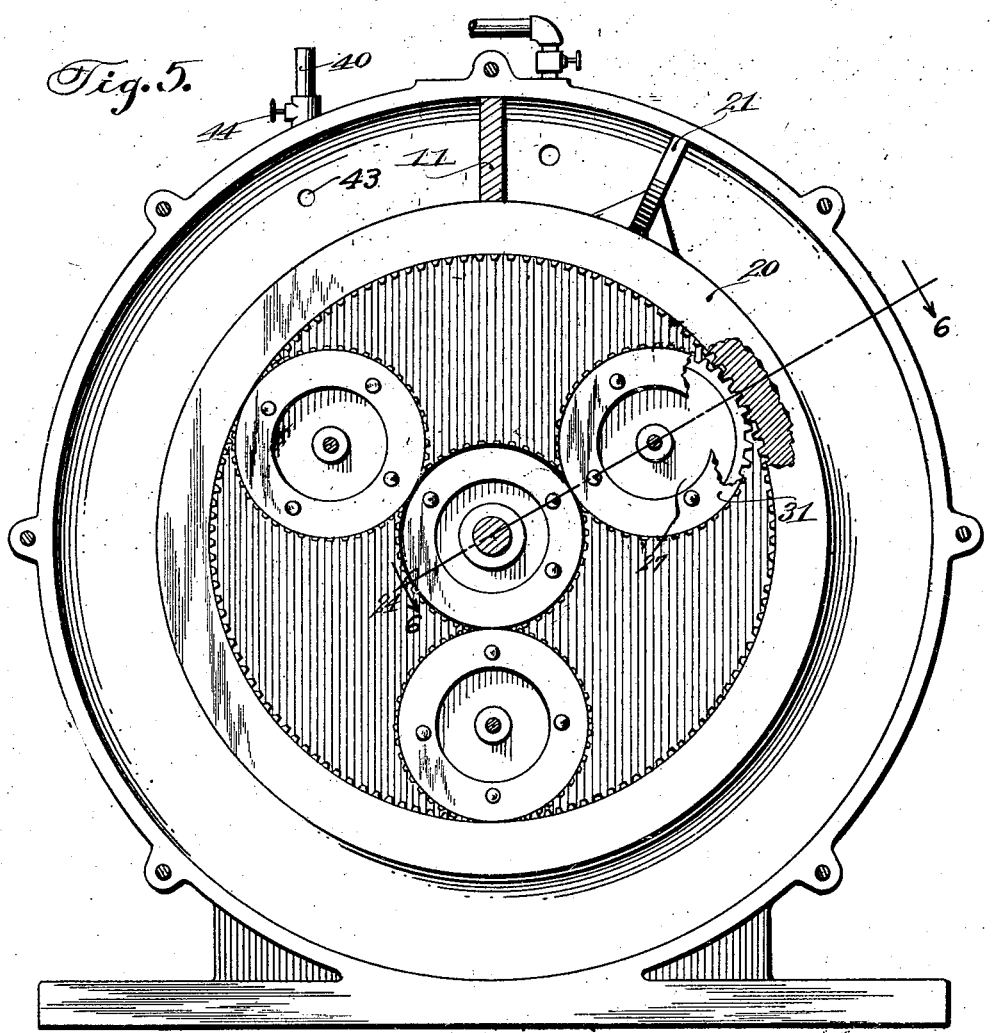
Figure 6:
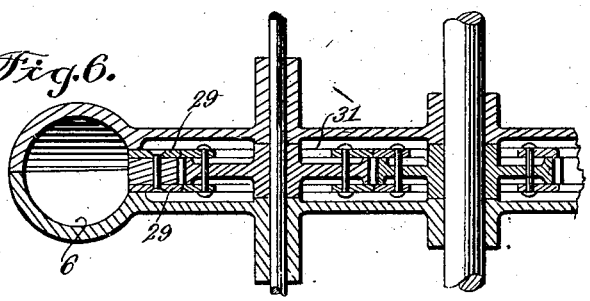
Figure 7:
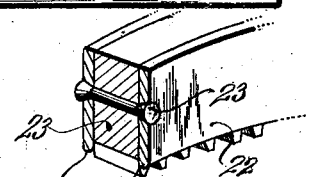
Figure 8:
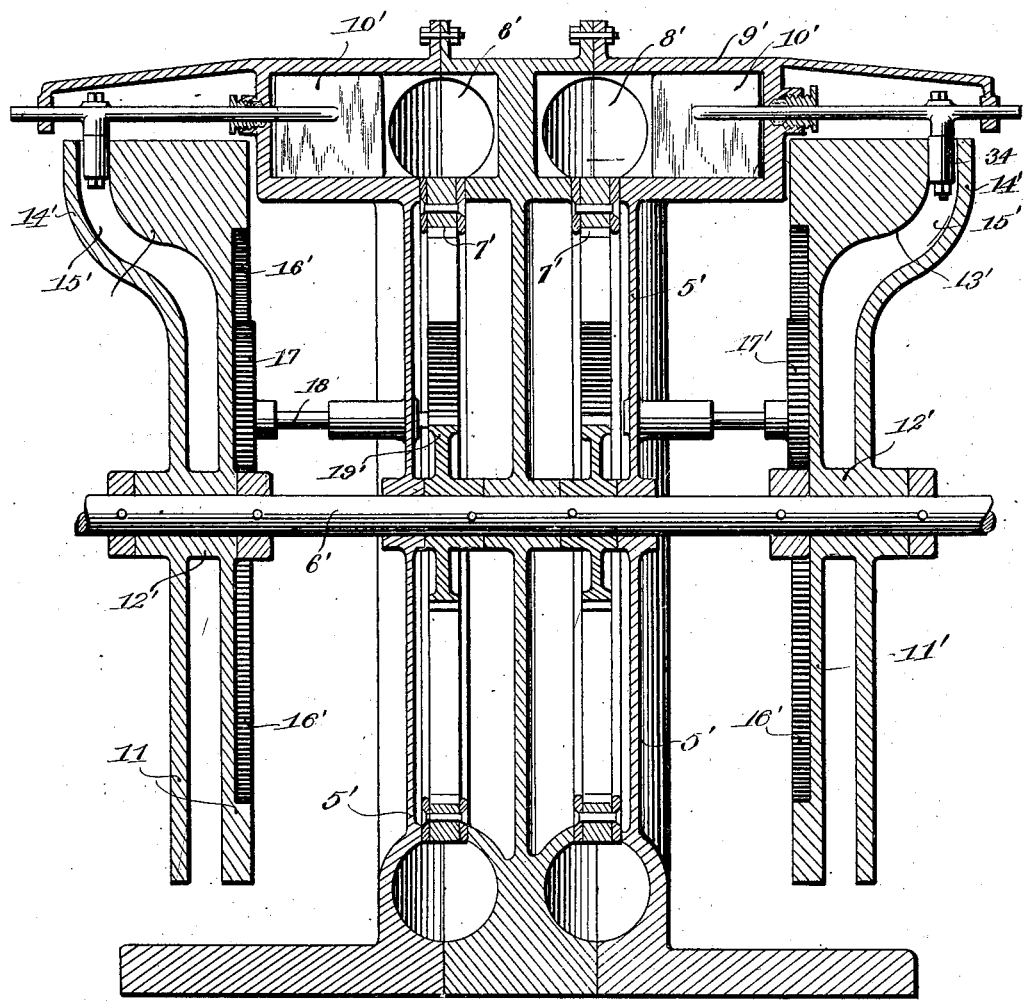
Figure 9:
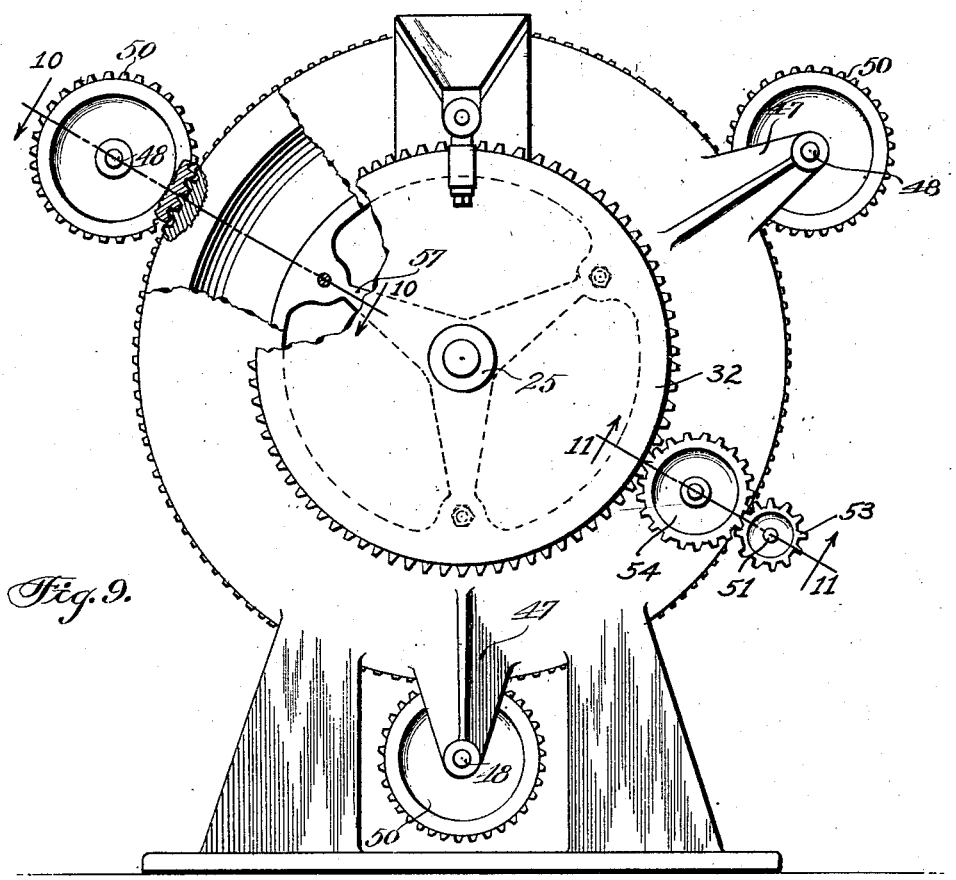
Figure 10:
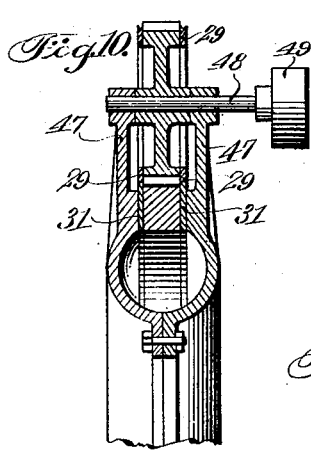
Figure 11:
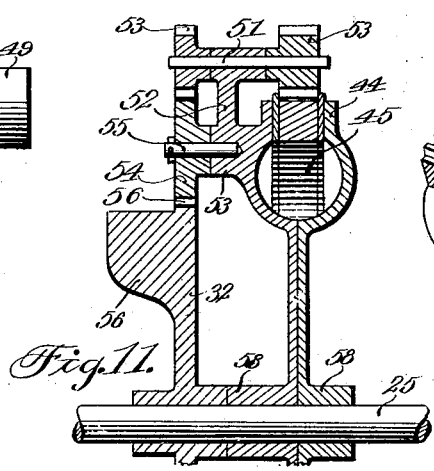

Figure 4 is a vertical sectional view taken on line 4—4 of Figure 1;

Figure 5 is a vertical sectional view taken on line 5—5 of Figure 3;

Figure 6 is a detail sectional view taken on line 6—6 of Figure 5;

Figure 7 is a fragmentary perspective of the ring gear embodied in the invention;

Figure 8 is a vertical sectional view of a modified embodiment of the invention;

Figure 9 is an elevation with parts broken away of a second modified embodiment of the invention;

Figure 10 is a fragmentary vertical sectional view taken on line 10—10 of Figure 9;

Figure 11 is a similar view taken on line 11—11 of Figure 9; and

Figure 12:
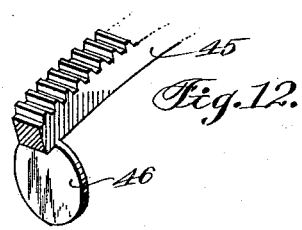

Figure 12 is a fragmentary perspective of the ring gear embodied in this form of the invention.

Referring to the invention in detail a circular two-part casing is designated at 5 which is formed with a piston chamber 6 circular, in cross section, having registering ears 7 at spaced intervals receiving removable fastenings 8 for securing the casing parts or sections together. Upon its lower side the casing is formed with a base 9 for supporting the former in a vertical position.

At its highest point the casing is formed with a transversely extending rectangular compartment 10 having communication with the piston chamber, and operating in this compartment are oppositely movable cooperating abutments 11, the latter being movable to positions to extend across the piston chamber to sever communication between the latter and the compartment, and to positions at opposite sides of the piston chamber at predetermined times.

Arranged at opposite sides of the compartment and extending horizontally therefrom are plates 12 which are secured at their inner ends to the compartment by removable fastenings 13. A vertical extension 14 having a guide opening 15 is formed with the outer end of each of the plates 12 and slidably receives longitudinally movable horizontal rods 16 projecting from the abutments 11, the latter passing through stuffing boxes 17 formed with the outer ends of the compartment. Received on the stems 16 and bearing against shoulders 18 thereon and the extensions 14 are expansible coil springs 19 which normally urge the stems and their abutments towards each other.

Revoluble between the casing sections and at a point in close proximity to the piston chamber, is an internal ring gear 20 attached to the periphery of which is a circular piston 21 snugly received and revoluble in the piston chamber. Disposed upon opposite sides of the ring gear are wear rings 22 which are secured by means of fastenings 23 passing transversely through the ring gear.

A central driving gear 24 is received within the casing and fixed to a power shaft 25 passing centrally through the casing and carrying a fly wheel 26 at one end. Interposed between the ring gear and the power gear is a plurality of radially disposed gears 27 affording a driving connection between the ring gear and the power gear. These gears 27 are spaced about the ring gear and are mounted on transverse shafts 28 passing through the casing 5. It will be observed that upon rotation of the ring gear incident to the actuation of the piston, the gears 27 revolve about the shaft 28 to rotate the latter.

In order to prevent lateral movement of the ring gear the inner edges of the rings 22 project beyond the inner face of the ring gear and are rounded or convex, as at 29, and are received in peripheral semi-circular grooves 30 formed in plates or disks 31 secured to the opposite faces of the gears 27.

For the purpose of moving the abutments 11 laterally away from the piston chamber, as the piston approaches, to permit its passage through the chamber 10 at predetermined times, a disk 32 is fixed to rotate with each end of the shaft 25. Formed upon the outer face of each of these disks and extending circumferentially thereof at its outer edge, is a cam surface 33 against which vertical rollers 34, carried by the rods or stem 16, engage. These rollers 34 are revoluble upon vertically disposed bolts 35 carried by the stems or rod 16 intermediate their ends. It will be observed that the coil springs 19, normally urging the abutments 11 towards each other, resiliently hold the rollers in contact with the outer faces of the disks so that upon each revolution of the disks the cam surfaces will engage the rollers and shift the stems 16 longitudinally in opposite directions to move the abutments to the opposite ends of the chamber 10, as illustrated in Figure 3.

A main steam pressure supply pipe 36 is provided having branch intake pipes 37 and 38 which communicate with the piston chamber. Exhaust pipes 40 and 41 lead from exhaust ports 43 in the piston chamber located to one side of the branch pipes 37 and 38. Control valves 44 are provided in each of the branch pipes 37 and 38 and exhaust pipes 40 and 41. Normally one set of intake and exhaust pipes are inoperative while the other set is open to allow steam to enter the piston chamber and exhaust therefrom.

However, when it is desired to rotate the piston in a counter clockwise direction, the second set of intake and exhaust pipes are rendered operative while the other set is rendered inoperative.

In Figure 8 a multiple type turbine is disclosed. In this instance a pair of parallel casings 5' is provided through which a single drive shaft 6' passes. A ring gear 7' is revoluble in the casing and fixed to each of these ring gears is a piston 8' movable in the piston chamber of each casing.

Extending transversely at the top of the casings and projecting beyond the same is a chamber 9' identical to the chamber 11, but of a greater length than the latter. Slidable abutments 10' corresponding to abutments 11 are slidable in the casing in the chamber, and are adapted to extend across the piston chamber.

With this modified embodiment of the invention a modified abutment actuating disk is employed at each end of the shaft comprising a pair of spaced circular plates 11' integrally connected at their centers by a hub 12' which is revoluble on the drive shaft. A cam surface 13' is formed upon the outer face of the innermost plate 11', at its outer edge, while that part of the outermost plate directly opposed to the cam surface is bulged or offset laterally as at 14', which is of the same shape cross sectionally as the cam surface, and with the latter provides a cam groove 15'. The rollers 34 movable with the abutments are disposed between the plates of each disk and move into the cam grooves 15' as the cam surfaces approach to draw the abutments to the opposite ends of the compartment.

To rotate the disks the inner face of each of the innermost plates are formed with internal gear teeth 16', which mesh with gears 17' supported on shafts 18' passing through the casings 5', and fixed to one of the plurality of meshing gears 19' in each casing.

In Figures 9 to 12, inclusive, another modification of the invention is disclosed. In this instance the casing 5 is formed with parallel spaced annular flanges 44 at its outer edge and rotatable between these flanges is an exteriorly toothed ring gear 45 to the inner face of which a right angularly extending piston 46 is attached, the latter being arranged within the casing 5.

Equidistantly spaced pairs of bearings 47 radiate from the casing 5 in each pair of which a shaft 48 is journalled. A drive element 49 is fixed to rotate with any one or all of these shafts 48. A gear 50 disposed between each pair of bearings 47 is fixed to each of the shafts and meshes with the teeth of the ring gear 45. As illustrated in Figure 10 the ring gear and gears 50 have rolling contact to retain the ring gear in a central position by means of coacting annuli 29 and disks 31. It will be seen that upon rotation of the ring gear incident to the movement of the piston 46 in the casing the gears 50 with their shafts will be rotated.

To rotate the disk 32 a horizontally disposed shaft 51 journalled in a bearing 52 formed and extending at right angles to a lateral enlargement 53 formed upon one side of the casing 5 is provided. This shaft 51 carries pinions 53 at its opposite ends, one of which is engaged by the ring gear and the other by an idler gear 54 journalled on a laterally projecting shaft 55 journalled in the enlargement 53. Circumferential gear teeth 56 are formed on the periphery of the disk 32 which are engaged by the idler gear 54. It will be observed that the disk 32 will be rotated through the driving connections from the ring gear and will rotate this disk for the purpose of actuating the abutments referred to in connection with the other embodiments of the invention.

As illustrated in Figure 9 the casing 5 is circular and disposed within the confines of this casing is a spider 57 whose arms are connected with the casing and at their inner ends define bearings 58 for the reception of the shaft 25 for the disk 32.

*Operation*

As the operation of all embodiments of the invention are identical, reference to Figure 1 only, is made. The abutments 17 being disposed in abutting relation across the piston chamber, and one set of intake and exhaust pipes being in operation, steam pressure is admitted to the piston chamber between the abutments and piston impelling the latter around the piston chamber. As the piston passes the exhaust port, steam pressure exhaust therefrom to the atmosphere or back to the generator, as desired. As the piston approaches the abutments, the latter separate by reason of the cam surfaces 33 engaging the rollers 34 and permits the piston to pass for the next revolution. When the piston passes through the chamber 11 the cam surfaces of the disks will have passed beyond the rollers, permitting the expansible springs 14 to function to return the abutments to abutting relation. It will be understood that any suitable valve mechanism may be provided for opening and closing the intake and exhaust pipes to control the supply and exhaust of steam to the casing.

What is claimed is:

1. In a rotary engine a casing of circular cross section whose side walls terminate in spaced parallel annular flanges at their outer edges, an annulus disposed between the flanges and guided for rotary movement and having teeth upon its outer face, a piston attached to the inner face of the annulus and arranged in the casing, and a plurality of radially disposed gears supported from the casing and engaging the teeth of the annulus, the gears serving to hold the annulus against radial displacement and as a medium for taking power from the annulus.

2. In a rotary engine a casing of circular cross section whose side walls terminate in spaced parallel annular flanges at their outer edges, an annulus disposed between the flanges and guided for rotary movement and having teeth upon its outer face, a piston attached to the inner face of the annulus and arranged in the casing, a plurality of radially disposed gears supported from the casing and engaging the teeth of the annulus, the gears serving to hold the annulus against radial displacement and as a medium for taking power from the annulus, circular plates secured to the opposite faces of the annulus and projecting beyond the teeth thereof, and a pair of circular plates attached to the opposite faces of each gear and having rolling contact with the edges of the first mentioned circular plates.

Signed at Washington, in the District of Columbia, this 8th day of Sept., A. D. 1927.

FRANK E. WELCH.